(12) United States Patent
Rohner et al.

(10) Patent No.: US 9,008,417 B2
(45) Date of Patent: *Apr. 14, 2015

(54) DENTAL COLOR ANALYZING DEVICE AND METHOF OF USE

(75) Inventors: Gottfried Rohner, Altstätten (CH); Diethard Bertsch, Göfis (AT); Michael Brotzge, Koblach (AT)

(73) Assignee: Ivoclar Vivadent AG, Schaan (LI)

( * ) Notice: Subject to any disclaimer, the term of this patent is extended or adjusted under 35 U.S.C. 154(b) by 496 days.

This patent is subject to a terminal disclaimer.

(21) Appl. No.: 12/791,243

(22) Filed: Jun. 1, 2010

(65) Prior Publication Data

US 2010/0303315 A1 Dec. 2, 2010

(30) Foreign Application Priority Data

May 29, 2009 (EP) ..................................... 09161604

(51) Int. Cl.
*G06K 9/00* (2006.01)
*G01J 3/02* (2006.01)
*G01J 3/46* (2006.01)
*G01J 3/50* (2006.01)

(52) U.S. Cl.
CPC ................. *G01J 3/02* (2013.01); *G01J 3/0264* (2013.01); *G01J 3/46* (2013.01); *G01J 3/463* (2013.01); *G01J 3/50* (2013.01)

(58) Field of Classification Search
USPC ............................................ 382/165; 433/26
See application file for complete search history.

(56) References Cited

U.S. PATENT DOCUMENTS

| 5,177,694 | A |   | 1/1993  | Graham et al. |
|---|---|---|---|---|
| 5,653,589 | A |   | 8/1997  | Kleinamnn |
| 5,725,372 | A | * | 3/1998  | Leon .............................. 433/26 |
| 6,007,332 | A | * | 12/1999 | O'Brien ......................... 433/26 |
| 6,328,567 | B1|   | 12/2001 | Morris et al. |

(Continued)

FOREIGN PATENT DOCUMENTS

WO     02086431     10/2002

OTHER PUBLICATIONS

USPTO; Non-Final Rejection in U.S. Appl. No. 12/771,873; Mar. 18, 2013; pp. 1-10.

(Continued)

*Primary Examiner* — Jingge Wu
(74) *Attorney, Agent, or Firm* — Ann M. Knab; Thad McMurray (57) ABSTRACT

The invention relates to a dental color analyzing device comprising a housing, a computer device having a storage unit, and a display on which a reference object together with at least one tooth and/or a gingival area is represented, wherein at least one first image section that shows the reference object as well as at least one second image section that displays the tooth, a tooth region or a gingival area, may be detected with the aid of the computer device, characterized in that the reference object is mounted on a tooth and in particular is attached thereto and comprises a smaller size than the represented tooth, wherein the reference object is a dental color key comprising color samples that are arranged next to one another and that each represent a dental color, and in that the color of the second, in particular selectable image section, is comparable to the represented color samples with the aid of the computer device such that the color sample that matches the color of the second image section best, may be displayed on the display.

18 Claims, 2 Drawing Sheets

(56) References Cited

U.S. PATENT DOCUMENTS

| | | | |
|---|---|---|---|
| 6,628,829 B1* | 9/2003 | Chasen | 382/167 |
| 6,726,476 B2* | 4/2004 | Jung et al. | 433/26 |
| 6,743,014 B2* | 6/2004 | Kerschbaumer et al. | 433/26 |
| 6,832,913 B2* | 12/2004 | Lehmann | 433/26 |
| 6,925,205 B2* | 8/2005 | Leedham et al. | 382/167 |
| 2003/0124481 A1* | 7/2003 | Zun | 433/26 |
| 2005/0175949 A1* | 8/2005 | Grunenfelder et al. | 432/120 |
| 2006/0114460 A1 | 6/2006 | Boyer et al. | |
| 2006/0250668 A1 | 11/2006 | Komiya et al. | |
| 2009/0033927 A1 | 2/2009 | Kerschbaumer | |
| 2009/0246727 A1* | 10/2009 | Vanini et al. | 433/26 |

OTHER PUBLICATIONS

USPTO; Final Rejection in U.S. Appl. No. 12/771,873; Apr. 12, 2012; pp. 1-11.

USPTO; Non-Final Rejection in U.S. Appl. No. 12/771,873; Oct. 17, 2011; pp. 1-12.

* cited by examiner

DENTAL COLOR ANALYZING DEVICE AND METHOF OF USE

CROSS-REFERENCE TO RELATED APPLICATIONS

This application claims foreign priority benefits under 35 U.S.C. §119(a)-(d) from European patent application ser. no. 09 161 604.5 filed May 29, 2009.

TECHNICAL FIELD

The invention relates to a dental color analyzing device comprising a housing having and a display on which a reference object together with at least one tooth and/or a gingival area is represented, wherein at least one first image section that shows the reference object as well as at least one second image section that displays the tooth, and a computer device having a storage unit, whereby a tooth region or a gingival area may be detected with the aid of the computer device.

BACKGROUND OF THE INVENTION

For the determination of tooth colors, color keys have been employed for a long time that are to make it possible to achieve a best possible match or approximation to the neighboring teeth when selecting a color of a tooth to be restored in order to be capable of giving the restoration a natural appearance.

A dental color key of this kind is disclosed in U.S. Pat. No. 5,653,589.

In recent times, an electronic color determination has been carried out, as it is apparent for example from US 2009/0033927 A1.

Within a tooth, the color shade typically changes, and in particular the translucency.

In order to exclude human influences during the assessment, it has also been proposed to detect an existing tooth color with the aid of a dental camera and to electronically select the suitable tooth color such as A1, A2, A3 etc. For a solution of this kind, however, elaborate calibration steps have to be conducted, and an electronic color detection device rather comes into consideration in larger dental offices.

Electronic color detection, however, surprisingly often does not produce the optimal results as a dental camera for example detects the translucency only inadequately. In order to achieve some improvement, in some cases an additional matching with a commercial color key is carried out that basically involves extra effort.

Further, it has already been proposed to automatically conduct an image detection or capture of an existing picture taken by a dental camera. In order to compensate for the color errors, it has also been proposed to conduct a color transformation, as a result of which it has been found that this solution despite the effort thereby incurred unfortunately does not achieve improved results.

OBJECTS AND SUMMARY OF THE INVENTION

It is an object of the invention to produce a dental color analyzing device as well as a method for analyzing dental colors that is improved for the practical implementation of the manufacture of a tooth restoration or a partial restoration and with the aid of which a more harmonic implementation of the restorations is possible, wherein the dental color analyzing device is easy to handle and particularly cost-efficient to manufacture.

By means of the inventive dental color analyzing device it is achieved that with a single device and with a single image of the tooth to be restored and of the neighboring teeth, which image or picture is taken with the analyzing device without requiring an additional dental camera, a precise color analysis of the tooth to be restored is effected and if necessary, the image representation of the tooth to be restored is displayed on a display of the analyzing device.

The color analysis is inventively conducted with the aid of a so-called miniature color key that is smaller than the vestibular face of a reference tooth. The miniature color key comprises a plurality of individual color samples such that upon selecting a color sample, the tooth to be restored is provided with the selected color and a comparison with the reference tooth and/or the additional neighboring teeth illustrated in the picture is automatically conducted. Although the reference tooth is partially covered by the color key, this is not disruptive or troublesome for assessing the tooth color. Due to the physical proximity of the color key to the tooth to be restored, a better assessment of the harmony of colors is achieved when viewed directly.

The small dimensions of the miniature color key permit an attachment thereof at different parts or sections of the reference tooth, and thus, if necessary, to only conduct the color determination for those parts of the tooth to be restored that need restoration and that may comprise different shades, as is commonly known. For instance, a natural tooth comprises a darker shade on its gingival area than the remaining tooth.

With the aid of the inventive dental color analyzing device it is achieved that with an image detection device that is included in the dental color analyzing device, both a tooth and/or its neighboring tooth and a dental color key are captured in one single picture and may be stored in a computer device of the analyzing device. The dental color key in this respect is formed in such a manner that it may be mounted and fixed to at least one tooth. However, several color keys that not only comprise well-established or popular tooth colors but also bleaching colors and/or gingival colors, may be stored in a storage device of the dental color analyzing device, in order to place them as virtual color keys on the neighboring tooth of the tooth to be restored. In this respect, the color key comprises a smaller dimension than the tooth, on which the color key is mounted or fixed in order to enable the common determination of the tooth colors. Moreover, there is a close spatial neighborhood or physical proximity between the color sample as a reference and the second image section representing the tooth.

The small dimensions of the color key enable it to be located or arranged at different positions of the tooth that is adjacent to the tooth to be restored. In this connection, the small dimensions of the color key that comprises color samples arranged next to one another, does not interfere with the accuracy of the tooth color analysis, as a reference tooth provided with the color key, may be represented on the display in an enlarged manner, and specific areas of the tooth may be selected and displayed. With a virtual color key it is therefore particularly advantageous that it may be arranged on the selected, enlarged areas of the reference tooth in order to realize a better image representation of the respective area, wherein a color comparison may be conducted with the naked eye as well.

It is considered to be particularly preferable if the reference object attached to the tooth, that is to say the color key, is centrally attached to a reference tooth, wherein all color samples are distant from the neighboring surface of the reference tooth at most one single width and/or height of a color sample, that is to say at most one additional color sample is arranged between a surface of the tooth to be assessed and the color sample whose color is most similar to this surface. As a result, the dentist or dental technician may determine the color sample appropriate in terms of color in a simple manner and with high certainty even with the naked eye. Due to the fact that the dental color key may be mounted and fixed on the tooth, or may also be applied to the tooth as a virtual color key, the user of the inventive dental color analyzing device may move the color key on the surface of the tooth and turn it so that there is always at most one further color sample between the free area of the tooth to be assessed and a color sample of the color key.

According to the invention it is particularly favorable that the dental color analyzing device comprises a housing, a computer device having a storage unit and a display, on which a reference object together with at least one tooth and/or a gingival area is represented, wherein at least one image section of the reference object—a first image section—as well as at least one image section of the tooth, of a tooth area or of a gingival area—a second image section—is detected with the aid of the computer device.

According to the invention it is particularly favorable that the reference object is a dental color key comprising color samples that are arranged next to one another and that each represent a dental color, and that the color of the second, in particular selectable image section is compared to the represented color samples by the computer device, wherein the computer device displays or outputs which color sample is most similar to or matches best the color of the second image section.

The dental color analyzing device according to the invention provides that with the aid of the computer device, the color of a selectable image section is compared to the color samples of the color key represented on the display of the dental color analyzing device, wherein the color key is mounted on the reference object and is substantially smaller in size than the reference object, such that the color sample that is most similar to the color of the selected image section, can be displayed on the display. In this manner, with the aid of the dental color analyzing device according to the invention it is possible to adapt a particular zone of the reference tooth to the virtual tooth color key. In this respect, color errors of the image detection device may be compensated automatically as the dental color key represents the true tooth colors such as A2, A3 as it is commonly known, and the color detection device merely has to ensure that no chrome gradients exist within the image which, however, typically is not the case with the usual CCD sensors.

Surprisingly, the calibration of the image detection device is not required with the dental color analyzing device according to the invention, and also the elaborate or time-consuming recalibration that is particularly unwanted in dental laboratories, has not to be conducted anymore. According to the invention, it is further provided that in case the picture or image is represented on a display, the computer device automatically conducts a color comparison, and the color sample of the reference object that is formed as a dental color key, is displayed or output as a first image section that is most similar to the color of the stored tooth, tooth region or gingival region. This can also easily be done electronically, in which case the color determination via the direct visual comparison on the display surprisingly may be considerably improved. According to the invention, the reference object is additionally represented in the second image section on the display, in particular adjacent thereto.

Consequently, the advantages of the visual assessment through a person may be in fact combined with the advantages of the electronic comparison, since the dental technician or dentist may come into action here and may for example configure the occlusal area of the teeth more transparently than it is provided by the electronic comparison.

In an advantageous embodiment, an approximation to uniformly colored areas of the detected tooth or tooth region is virtually conducted automatically. The reproduction must not be provided as a color reproduction, but may for example also immediately present the required assistance to the dentist or dental technician which tooth color is to be employed at which position with the aid of a hachure or a pattern that is designated as A2, A3 etc.

The number of the color samples of the tooth color key can be adapted to the requirements in any chosen way. Typically, several different color keys may be used, and that color key is selected that from the basic tint seems to be most suitable for the restoration wherein this color key may for example have 16 color samples that are arranged in the form of a matrix.

The results or values output and stored by the computer device can also easily be exported in an electronically processed manner, for example also to a CAD/CAM device for the manufacture of teeth, wherein it is particularly favorable if corrections can still be carried out by the dental technician manually.

Typically, the dental color key is attached on the vestibular surface of the tooth at any position as a miniature dental color key and is formed such that it is in close neighborhood to the second image section. It may be attached in a slidable manner in order to be able to detect all regions of the vestibular surface of a tooth. In this respect, it is considered to be particularly advantageous if the selected tooth color is shown in the defined zone of the tooth. The color key, however, may also be mounted on different teeth. In case of one or several color keys being stored as virtual color keys, the color key having the largest color match with the reference teeth may be selected with the aid of a cursor for example and positioned on the reference tooth. In this regard it is considered to be particularly advantageous if the stored color keys can be displayed on the display of the dental color analyzing device.

A particularly favorable configuration provides that each color sample is represented on the display in the form of a spatially restricted area that is in particular surrounded by a border line. In this respect, a cursor may point to this area in order to show the selected color on the tooth to be restored. In doing so, the computer device may calculate the deviation between the color shown and the color of the reference tooth. In case of the deviation being too large, a mixed color is calculated with the aid of the computer device, wherein said mixed color may be comprised of two or more color samples. Therefore, a plurality of color shades may be produced electronically by means of the inventive dental color analyzing device, wherein it is not necessary to store or save a plurality of color keys. The color sample produced by the analyzing device in this manner is comprised of mixed colors and not necessarily corresponds to one of the colors A1, A2 etc. included in the color key, may be used for the manufacture of the restoration.

Preferably, the color samples of the dental color key are arranged next to one another and together have a size that at most is twice as large and at least half the size of the representation of the tooth area or the gingival region on the display.

It is particularly favorable that the color sample that is most similar to the first image section, is displayed in an optically or also acoustically selected manner, whereas a pointer unit such as a cursor samples the second image section, that is to say the tooth, the tooth area or the gingival area. In addition to the display of the color sample, in particular the selected color sample, the naming or designation thereof (A1, A2 etc.) can be output optically, in particular on the display, and/or acoustically in an advantageous configuration of the inventive dental color analyzing device. It is particularly important that the individual color samples may be displayed together with the designation A1, A2, etc. thereof, so that the color determination does not depend on the image quality and the lighting conditions at which the picture of the reference teeth and of the tooth to be restored is taken. In this connection, it is considered to be particularly advantageous, if the color samples that are fixedly mounted on a base body of the color key and that are mounted on one or two reference teeth for the purpose of comparison, are comprised of restoration material, and thus the picture of the reference tooth with the color key mounted thereon represents the actual lighting conditions irrespective of the image quality. Thus, the accuracy of the color analysis and consequently of the tooth restoration as well is considerably increased.

According to the invention it is particularly favorable that the dental color key comprises at least 3, in particular 16 different color samples, wherein at least one color sample corresponds to a bleaching color. However, it is conceivable as well and easy to realize with the dental color analyzing device according to the invention, to save or store one or several color keys that merely comprise bleaching colors as color samples.

The color key, however, may also comprise at least one color sample that corresponds to a gingival color.

Preferably, a miniature color key is stored in the storage device of the dental color analyzing device, said miniature color key being smaller than a reference tooth and merely comprising a matrix that only defines the areas of the respective color samples in the form of a grid, wherein a large number of color samples may be additionally stored and mixed or combined with one another till the desired mixed color develops. Those color samples that are selected by the computer device itself, may then be virtually applied to the free surfaces of the color key in order to increase the accuracy of the analysis with the aid of the "motley" color key.

Preferably, the analyzing device comprises a dental camera that is incorporated into the device. The analyzing device, however, may also interact with an external dental camera, wherein the image quality is not of vital importance for the analyzing process.

A particularly advantageous configuration of the dental color analyzing device according to the invention provides that the finished reconstruction with the tooth color is displayed on the display of the dental color analyzing device after the analyzing process, and in fact as a 3-dimensional image that may also serve as a presetting or parameter for the later restoration process. Consequently, the analyzing device according to the invention is not only used for the color analysis but also for the digital production and for the display of the finished restoration with the colors and shades determined after the analyzing process. In this respect, it is considered to be particularly preferable if the dental color analyzing device is provided with an interface in order to connect it to a personal computer such that the results of the analyzing process may be transferred to the personal computer and also to the dental laboratory via Internet. As a result, the dental technician himself is capable of making changes.

According to the invention it is particularly favorable that the computer device automatically signalizes the dental color, in particular outputs the dental color optically and/or acoustically.

It is further particularly favorable that in the storage unit of the analyzing device at least the data of two teeth can be stored, in particular data of teeth adjacent to one another, said data being supplied with the aid of a detection device such as a camera to the storage unit via a data transport device. In the storage unit data of several patients may be stored, wherein a picture is taken of the entire mouth situation, that is to say the teeth of the upper and lower jaw as well as the gingival area, with the aid of the dental camera and may be stored for the individual patient.

According to the invention it is particularly favorable that the dental color is exported—for example to a CAD/CAM device for the manufacture of teeth—and/or is signalized.

According to the invention it is particularly favorable that the first image section may be subdivided with the aid of the software into individual area segments that correspond to the geometric dimensions of the color samples, that a specific dental color that is stored in the software is allocated to each area segment, and that the color of the second image section including at least part of a tooth or part of the gingiva or gums is compared to the different color samples, and that the data computer and storage device displays or outputs said dental color that has been allocated to the color sample whose color corresponds to the color of the second image section or is most similar to it.

According to the invention it is particularly favorable that in particular the area of a tooth to be restored is smaller than the vestibular (labial or buccal) surface of two teeth in the representation on the display, in particular smaller than the area of a tooth.

An advantageous embodiment of the dental color analyzing device according to the invention provides that the device is provided with an additional color determination device so that the respective lightness group may initially be determined. Subsequently, an image is taken of the tooth to be restored and of at least the neighboring tooth with the color key mounted and fixed thereon and is displayed on the display of the analyzing device according to the invention. Subsequently, the remaining color characteristics are allocated within this lightness group. Therefore, the digital support in color determination is particularly important, as humans have a different color sensation. Additionally, further factors come into consideration, that is to say artificial or natural light, light reflected by the spatial environment, and notably the subjective impression. Contrary thereto, color determination devices are expected to provide a constant output, free from uncertainty factors. In the case of digital tooth color determination, a light beam is emitted with the aid of a probe by means of which the light reflection of the tooth is measured. These data are evaluated by means of a specific computer program and the tooth color is determined.

According to the invention it is particularly favorable that the color sample is represented on the display in the form of a spatially limited area that in particular is surrounded by a border line.

According to the invention it is particularly favorable that the color key is formed in a disk-like or flaky manner, wherein the color samples are fixedly mounted thereon, and wherein the color key comprises a thin base body that may be mounted on a tooth.

According to the invention it is particularly favorable that the color samples of the color key are arranged next to one another and together have a dimension that is at most twice as large and at least half the size of the representation of the tooth region or gingival region on the display.

According to the invention it is particularly favorable that the color key mounted on the tooth is mounted centrally on the a reference tooth, wherein all color samples are distant from the free or exposed area of the reference tooth at most a single width and/or height thereof.

According to the invention it is particularly favorable that the color sample most similar to the first image section is displayed in an optically and/or acoustically selected manner, whereas a pointer unit samples the second image section, that is to say the tooth, the tooth region or the gingival region.

According to the invention it is particularly favorable that in addition to the display of the color sample, in particular to the display of the selected color sample, its designation (A1, A2, . . . An) is displayed optically, in particular on the display, and/or is output acoustically.

According to the invention it is particularly favorable that the computer device indicates the color match on the display of the analyzing device, preferably in percent, after having selected a color sample between the reference tooth and the tooth to be restored.

According to the invention it is particularly favorable that the color key comprises at least 3, in particular 16 different color samples, wherein in particular at least one color sample corresponds to a bleaching color.

According to the invention it is particularly favorable that the color key comprises at least one color sample that corresponds to a gingival color.

According to the invention it is particularly favorable that the analyzing device comprises a camera or interacts with a camera.

According to the invention it is particularly favorable that a color determination device is provided for determining the lightness group of the tooth to be restored.

According to the invention it is particularly favorable that a method for analyzing dental colors is provided, said method comprising a housing, a computer device with a storage unit, and a display, on which a reference object together with at least one tooth and/or a gingival region is represented, wherein at least one first image section that shows the reference object as well as at least one second image section that displays the tooth, a tooth region or a gingival area, is detected with the aid of the computer device, characterized in that the reference object is mounted on a tooth, in particular before the tooth is represented on the display, and comprises a smaller size than the represented tooth, and wherein the reference object is a dental color key comprising color samples that are arranged next to one another and that each represent a dental color, and in that the color of the second, in particular selectable image section is compared to the represented color samples with the aid of the computer device such that the color sample that matches the color of the second image section best, may be displayed or output by the computer device.

BRIEF DESCRIPTION OF THE FIGURES

Further advantages, details and features of the invention emerge from the following description of several embodiments of the invention with reference to the drawings, in which.

DETAILED DESCRIPTION

Figure 1:
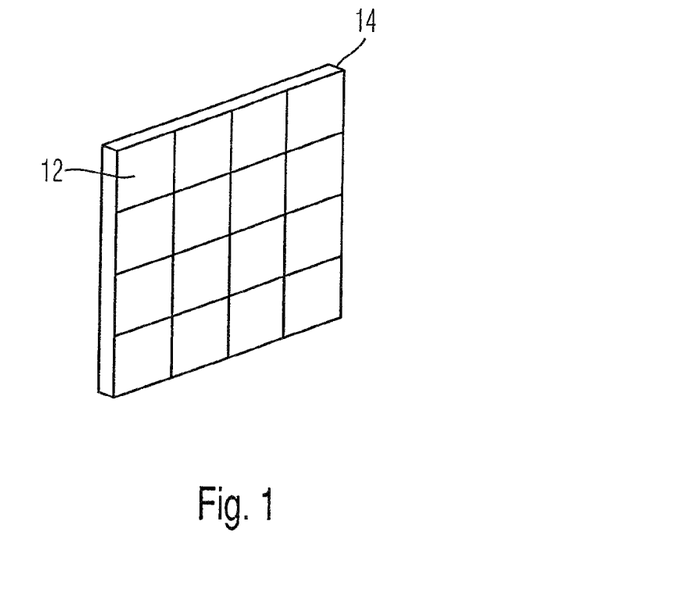
FIG. 1 shows a perspective representation of an embodiment of an inventive dental color key in schematic representation.

The inventive dental color key 10 represented in FIG. 1, comprises a plurality, that is to say sixteen, color samples 12 that are arranged in the manner of a matrix. Each color sample corresponds to a commercial tooth color such as A1, A2, A3, A4, etc., and it is preferred that tooth colors similar to one another are arranged next to one another.

The color samples 12 are fixedly attached to the disk-like dental color key. In this respect, the color key comprises a thin base body or plate 14 that is suited for being mounted on a tooth, namely on the vestibular surface thereof. The mounting can be effected either with the aid of an adhesive that retains the base body 14 in a manner such that it does not come loose in case of a soft nudge with the tongue, or with a clip that overlaps the tooth, preferably an incisor, and as a result provides for the desired clamping effect. The color key may be equipped with a double clip such that the color key may be attached to a tooth of the upper jaw and at the same time to a tooth of the opposed lower jaw. Consequently, with the aid of the dental color analyzing device according to the invention, a color comparison between the teeth of the upper and lower jaw may be conducted. However, it is also possible and considered to be particularly advantageous if the color key is not equipped with a self-contained clip but if a clip may be mounted on one or two teeth, wherein subsequently different color keys comprising different lightness groups of color samples may be mounted on the clip in order to determine the optimal match with a tooth color.

It is also possible to design the base body flexible to some extent such that it can better adapt itself to the slightly curved surface of the incisor. Preferably, the base body is notedly smaller than a tooth, for example half the width thereof, and significantly thinner, for example more than one decimal power. As a result, the inventive color key 10 rests on the tooth with its entire face, and it is possible to enable an immediate comparison between the color pattern 12 and the tooth. In this respect, sufficient free areas of the vestibular surface of the tooth remain, whereas it is to be understood that a neighboring tooth can also easily be compared to the inventive color key 10. Instead of the flexible design of the base body, it may also be slightly curved so that the base body may adapt itself to a natural tooth and represents the form of the labial surface of a natural tooth.

The dental color key 10 comprises color samples 12 that are manufactured from a restoration material, preferably ceramics. This embodiment is particularly important for the precise assessment of the tooth color as the image of the tooth or the adjacent teeth may be taken under different lighting conditions. Due to the fact, however, that the color samples 12 correspond to the tooth restoration material, it is achieved that the quality of the image does not have a negative effect on the restoration result.

Figure 2:
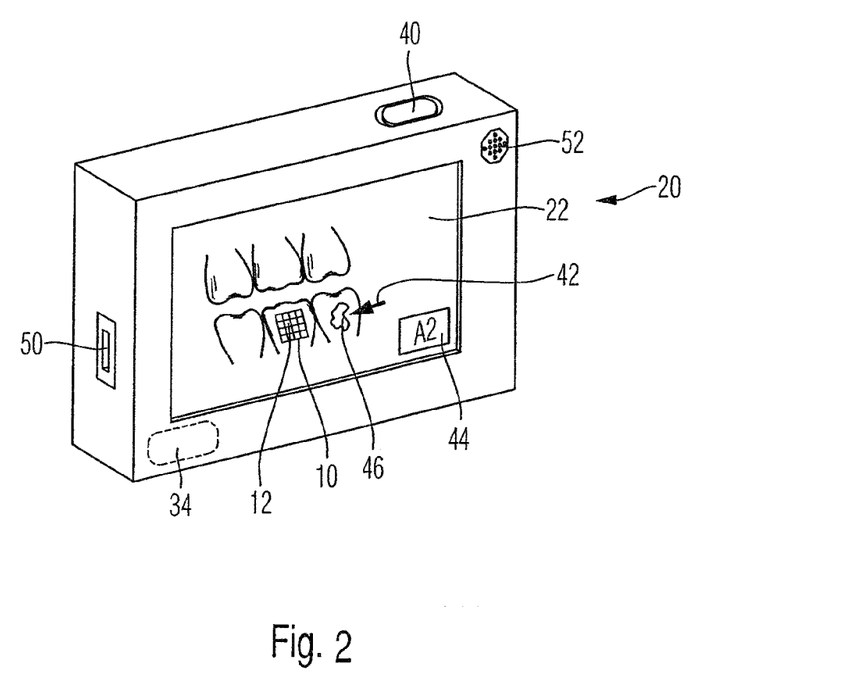
FIG. 2 shows a perspective representation of an inventive dental analyzing device.

FIG. 2 shows a dental analyzing device 20. The dental analyzing device 20 comprises a display 22 as well as a storage unit 34 which includes a computer. As a result, a compact dental color analyzing device is produced that is less expensive in its manufacture than conventional dental color analyzing devices. The dental analyzing device 20 comprises a CCD sensor having an optic on the side that is not represented, i.e. the side opposing the display 22, in order to enable an image detection by means of a digital photo. In this respect, a release 40 is mounted on the upper side of the analyzing device 20 in a manner that is known form digital cameras.

The dental analyzing device that simultaneously comprises a computer device and the storage unit 34, now takes a picture of the vestibular mouth situation of the patient having the dental color key 10 attached thereto. A cursor 42 can be moved across the display 22, for example across a touch screen. In the case of a movement of the cursor 42 across the display 22, a color sample designation 44 such as "A2" is each shown in a specific field on the display, and at the same time a contour 46 that corresponds to a selected color 12 of the color sample of the dental color key 10. As a picture is taken of the dental color key together with the tooth situation, even without a calibration, no color errors arise in this respect.

In this way, the color gradient for one tooth is determined with the aid of the dental tooth colors available. The picture stored in this manner may now be output and further processed in any suitable manner with the aid of an interface 50.

As it is shown in FIG. 2, the color key with the color samples attached thereto is mounted on the tooth as a miniature color key. The miniature color key may be attached to the tooth either mechanically or adhesively. It may, however, also be attached as a virtual color key to the image of a tooth adjacent the tooth to be restored. With the aid of the cursor 42, the user of the device may point at one of the color samples such that the tooth to be restored illustrates the displayed tooth color on the display. The user then may either assess subjectively and decide which tooth color he selects for the tooth restoration, or the storage unit itself may select the tooth color that is closest to the neighboring teeth.

If the color key 10 is represented as a virtual color key, it may be positioned on the neighboring teeth or the teeth displayed above with the aid of a movement of the cursor such that with only one single image the entire color situation of the teeth of the upper and lower jaw may be detected and analyzed. This is particularly advantageous if not only one tooth is in need of repair, but a tooth crown or a denture or set of teeth has to be restored.

A loudspeaker 52 may additionally output acoustic signals in any chosen way, for example it may also name the detected color samples.

Figure 3:
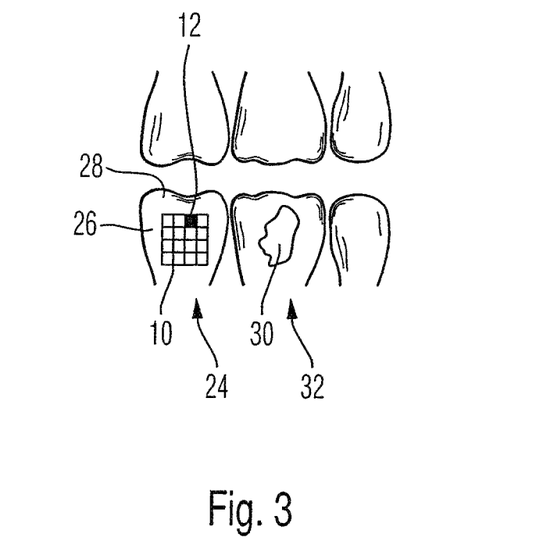
FIG. 3 shows a top view of an inventive dental color key after it has been applied to a tooth.

FIG. 3 shows in which manner an inventive color key 10 can be mounted on a tooth 24. In the represented embodiment, the color key 10 is centrally mounted on the vestibular face 26 of the tooth such that free faces 28 surround the color key 10 at all sides thereof. This is particularly advantageous as a tooth may have different color shades. The miniature color key may be mounted on the labial surface of a tooth, in fact at different positions.

By means of an optical comparison, either direct or with tools, one manages to detect the match of a color pattern 12 with a surface 30 of a neighboring tooth 32 such that the tooth color for this surface 30 is determined and thus detected.

It is particularly favorable if in case of a photographic support, this is realized with the same photograph, as no calibration is then required but the respective tooth color is detected automatically.

Figure 4:
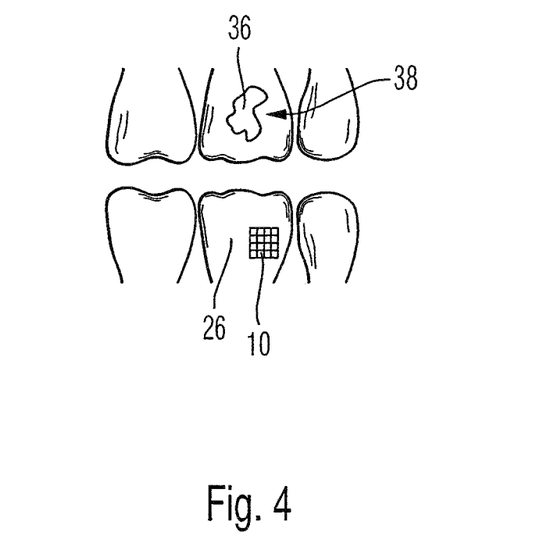
FIG. 4 shows a top view of a further embodiment of the inventive dental color key after it has been applied to a tooth.

FIG. 4 shows in which manner a color key 10 is employed in order to detect an area 36 of an antagonist 38. In the embodiment shown, the dental color key 10 is distally mounted on the vestibular face of the tooth such that there are formed comparatively large free areas 26 on three sides that are particularly well suitable for assessing the tooth color.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. A method of analyzing dental colors comprising:
   placing a dental color key on the vestibular face of a reference tooth, the color key being smaller than the vestibular face of a reference tooth, and the color key comprising at least sixteen individual color samples of different tooth colors, wherein the sixteen color samples are arranged in a matrix and wherein tooth colors similar to one another are arranged next to one another;
   capturing and displaying an image of the dental color key and a portion of the reference tooth adjacent the color key and/or its neighboring tooth;
   comparing the color of the captured image of the reference tooth and/or its neighboring tooth to the captured image of the color key; and
   determining the closest color sample to the reference tooth.

2. The method of analyzing dental colors as set forth in claim 1 wherein the image is captured and displayed on a storage unit (34) which further includes a computer for comparing the colors of the reference tooth and/or its neighboring tooth to the plurality of individual color samples on the dental color key.

3. A method for analyzing dental colors, said method comprising:
   providing a housing, a computer device with a storage unit, and a display on which a reference object together with at least one tooth and/or a gingival region may be represented, wherein at least one first image section that shows the reference object as well as at least one second image section that displays the tooth, a tooth region or a gingival area, which is detected with the aid of the computer device;
   mounting the reference object on a tooth before the tooth is represented on the display, the reference object being a smaller size than the represented tooth, and wherein the reference object is a dental color key comprising at least sixteen color samples (12) that are arranged next to one another and that each represent a dental color, wherein the sixteen color samples are arranged in a matrix and wherein tooth colors similar to one another are arranged next to one another;
   comparing the color of the second image section to the represented color samples (12) with the aid of the computer device; and
   outputting the color sample (12) that best matches the color of the second image section best by the computer device.

4. The method as claimed in claim 3, wherein the computer device automatically signalizes the dental color.

5. The method as claimed in claim 4 wherein the dental color may be displayed optically.

6. The method as claimed in claim 4 wherein the dental color may be signaled acoustically.

7. A dental color analyzing device, comprising a housing, a computer device having a storage unit, and a display (22) on which a reference object (12) together with at least one tooth (24) and/or a gingival area is represented, wherein at least one first image section that shows the reference object (12) as well as at least one second image section that displays the tooth (24), a tooth region or a gingival area, may be detected with the aid of the computer device, characterized in that the reference object is mounted on a tooth and comprises a smaller size than the represented tooth, wherein the reference object is a dental color key (10) comprising at least sixteen color samples (12) that are arranged next to one another and that each represent a dental color, wherein the sixteen color samples are arranged in a matrix and wherein tooth colors similar to one another are arranged next to one another, and in that the color of the second selectable image section (46) is comparable to the represented color samples (12) with the aid of the computer device such that the color sample (12) that matches the color of the second image section best, may be displayed on the display.

8. The analyzing device as claimed in claim 7, wherein the color sample (12) is represented on the display in the form of a spatially limited area that is surrounded by a border line.

9. The analyzing device as claimed in claim 1 wherein the color key (10) comprises a thin base body (14) that may be mounted on a tooth, and wherein the color key is formed in a disk-like or flaky manner, the color samples (12) being fixedly mounted on the base body.

10. The analyzing device as claimed in claim 7, wherein the color samples (12) of the color key (10) are arranged next to one another and together have a dimension that is at most twice as large and at least half the size of the representation of the tooth region or gingival region on the display.

11. The analyzing device as claimed in claim 7, wherein the color key (10) is centrally mounted on the reference tooth, wherein all color samples (12) are distant from the free or exposed area of the reference tooth at most a single width and/or height thereof.

12. The analyzing device as claimed in claim 7, wherein the color sample (12) most similar to the first image section is displayed in an optically and/or acoustically selected manner, whereas a pointer unit samples the second image section, that is to say the tooth, the tooth region, or the gingival region.

13. The analyzing device as claimed in claim 7, wherein in addition to the display of the selected color sample (12), its designation (A1, A2, . . . An) is displayed optically on the display, and/or is output acoustically.

14. The analyzing device as claimed in claim 7, wherein the computer device indicates the color match on the display of the analyzing device, preferably in percent, after having selected a color sample between the reference tooth and the tooth to be restored.

15. The analyzing device as claimed in claim 7, wherein the color key (10) comprises at least 16 different color samples (12), wherein at least one color sample (12) corresponds to a bleaching color.

16. The analyzing device as claimed in claim 7, wherein the color key (10) comprises at least one color sample (12) that corresponds to a gingival color.

17. The analyzing device as claimed in claim 7, wherein the analyzing device comprises a camera or interacts with a camera.

18. The analyzing device as claimed in claim 7, characterized by a color determination device for determining the lightness group of the tooth to be restored.

\* \* \* \* \*

UNITED STATES PATENT AND TRADEMARK OFFICE
CERTIFICATE OF CORRECTION

PATENT NO. : 9,008,417 B2  
APPLICATION NO. : 12/791243  
DATED : April 14, 2015  
INVENTOR(S) : Gottfried Rohner, Diethard Bertsch and Michael Brotzge Page 1 of 1

It is certified that error appears in the above-identified patent and that said Letters Patent is hereby corrected as shown below:

Title page, item (54) should read:

--(54) DENTAL COLOR ANALYZING DEVICE AND METHOD OF USE--

Signed and Sealed this
Fifteenth Day of September, 2015

Michelle K. Lee
*Director of the United States Patent and Trademark Office*